United States Patent [19]

Protz et al.

[11] Patent Number: 5,166,504
[45] Date of Patent: Nov. 24, 1992

[54] APPARATUS FOR CONTROLLING HIGH-POWER LASER BEAMS WITH FLEXIBLE MEMBER AND MIRROR

[75] Inventors: Rudolf Protz, Höhenkirchen; Michael Gorriz, München, both of Fed. Rep. of Germany

[73] Assignee: Messerschmitt-Bölkow-Blohm GmbH, Fed. Rep. of Germany

[21] Appl. No.: 759,562

[22] Filed: Sep. 13, 1991

[30] Foreign Application Priority Data

Sep. 13, 1990 [DE] Fed. Rep. of Germany ....... 4029074

[51] Int. Cl.⁵ .............................. G01J 1/20; H01J 3/14
[52] U.S. Cl. ................................ 250/201.1; 250/216; 359/847; 359/224; 356/152
[58] Field of Search ............... 250/201.1, 216, 206.1, 250/232-233, 208.2, 239; 356/152, 141; 359/847, 224; 219/121.78, 121.79, 121.81, 121.74

[56] References Cited

U.S. PATENT DOCUMENTS

| 3,504,182 | 3/1970 | Pizzurro et al. | 359/224 |
| 4,117,319 | 9/1978 | White III | 250/201.1 |
| 4,547,662 | 10/1985 | Cornuell | 250/201.1 |
| 4,705,365 | 11/1987 | Wakita et al. | 359/224 |
| 4,875,765 | 10/1989 | Vandenberg et al. | 359/224 |
| 4,998,260 | 3/1991 | Taniura | 356/152 |
| 5,047,609 | 9/1991 | Ekstrand | 356/152 |
| 5,102,214 | 4/1992 | Steek et al. | 359/847 |

FOREIGN PATENT DOCUMENTS 0013179 7/1980 European Pat. Off. ............ 359/224

*Primary Examiner*—David C. Nelms
*Assistant Examiner*—Michael Messinger
*Attorney, Agent, or Firm*—Evenson, Wands, Edwards, Lenahan & McKeown

[57] ABSTRACT

A sensor and adjusting element for controlling high-powered laser beams. A single structural member, which is integrated into the beam path of the laser, simultaneously permits the sensing and the correction of angle and focusing errors in the beam path of high-powered lasers.

19 Claims, 2 Drawing Sheets

APPARATUS FOR CONTROLLING HIGH-POWER LASER BEAMS WITH FLEXIBLE MEMBER AND MIRROR

BACKGROUND AND SUMMARY OF THE INVENTION

The present invention relates to a sensor and adjusting element for controlling high-power laser beams used for of material.

Existing prior art devices for laser beam control require several separate sensor and correcting elements, such as disclosed, for example, by the applicant's German Patent Documents DE-OS 31 34 555 A1, DE-OS 38 00 427 A1 or DE-PS 32 02 432 CS. Apart from the associated space requirement, considerable expenditures are also required just for the adjustability and fixing of the individual structural members or modules.

It is an object of the present invention to provide a sensor and adjusting element of the above mentioned type in which a single structural component simultaneously permits the sensing and correction of angle and focussing errors in high-power laser beam operations.

This and other objects and advantages are achieved by the control apparatus according to the invention, in which the sensor and adjusting element is inserted as a complete structural unit into the beam path of a high-power laser system for the treatment of materials, in order to simultaneously sense and correct angle and focussing errors of the treatment beam. The surface of the workpiece, which is acted upon by laser beams, is cooled by liquid in a known manner.

Other objects, advantages and novel features of the present invention will become apparent from the following detailed description of the invention when considered in conjunction with the accompanying drawings.

DETAILED DESCRIPTION OF THE DRAWINGS

Figure 1:
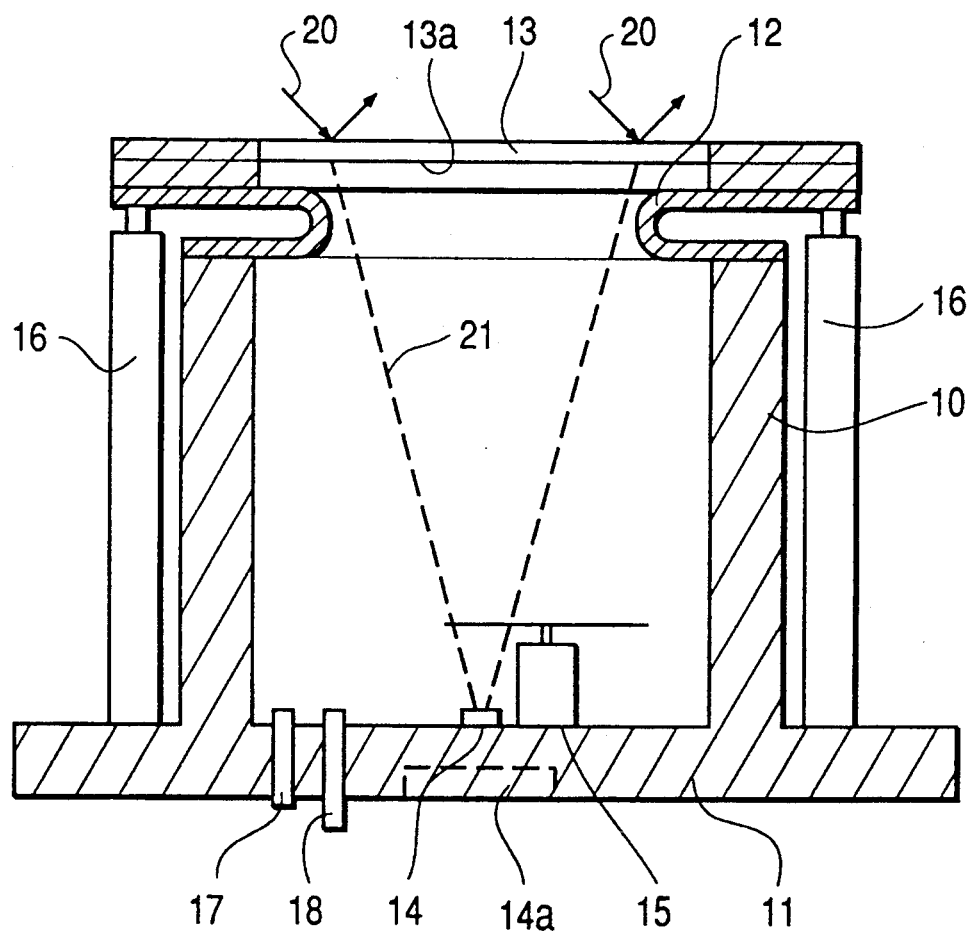
FIG. 1 is a cross sectional view of a laser beam control apparatus according to the invention.

As depicted in FIG. 1, the sensor and adjusting element 24 comprises a preferably cylindrical compression-proof and dimensionally stable housing body 10 and a dimensionally stable base and fastening plate 11 which closes off the lower end of the housing body. The fastening plate is used to secure the element at a predetermined position in the beam path of the laser material treatment system, and also serves as an integration part for a number of structural elements, as will be described below.

A ring-shaped flexible bellows element 12, fastened on the upper end of the housing body 10, supports a thin mirror plate 13 which is made of a silicon material, such as is disclosed for example in applicant's German Patent Document DE PS 34 08 263 C1. The surface of the mirror plate 13 is provided with a dielectric coating which reflects laser radiation of the wave length of 10.6 mm to a high degree—typically 99%. The remaining one percent of the laser radiation which is transmitted by the mirror plate 13 is coupled out of the beam path in the manner described in applicant's German Patent Document DE-PS 31 33 823 C1. A holographic optical element 13a is etched or photographically transferred to the underneath side of mirrorplate 13 and serves to focus the couple-out light on a four-quadrant detector 14 arranged on the bottom plate The holographic focussing element 13a is designed in such a manner that focussing takes place by introducing an astigmatism, in the manner described below. Mirror plate 13 is also provided with cooling ducts on its interior opposite the dielectric coating, such as disclosed in German Patent Document DE-PS 34 08 263 C1.

From the signals of the four-quadrant detector 14, the angular positioning and focussing error of the laser beam 20, 21 are determined by means of an electronic system 14a, such as described, for example, in the German Patent application P 40 12 927.6-33, filed on Apr. 24, 1990, and control signals corresponding to the angular position and focussing error determined by electronic system 14a are sent to the adjusting elements 16. Correction of the angular positioning is performed by two or more such adjusting elements 16 which are arranged between the mirror base and fastening plate 11, and which move the mirror plate 13 upward or downward as necessary, to achieve a desired angular position. Adjusting elements 16 may be constructed as piezoelectric or magnetostrictive actuators.

Focus correction is performed by increasing or decreasing the pressure in the interior cavity of the housing 10 by means of a compressed gas flowing into the volume of the housing body through the gas feeding device 18. In this manner, a controlled "bulging" is introduced into the mirror plate 13, and is used to adjust the focus. Adjustment of the respective desired pressure value takes place by means of the differential pressure sensor 17 integrated in the base and fastening plate 11, and a control valve (not shown).

The four-quadrant detector 14 is preferably constructed as a pyroelectric detector for the operation of which in the alternating-light mode, a mechanical light chopper 15 is disposed in the beam path adjacent hereto, as shown in Figure A commercially available pyroelectric quadrant detector which is suitable for this purpose, for example, is the ELTEC pyroelectric quadrant detector 4202 M4. Such a device is also disclosed in German Patent Document P 40 12 927.6.

Figure 2:
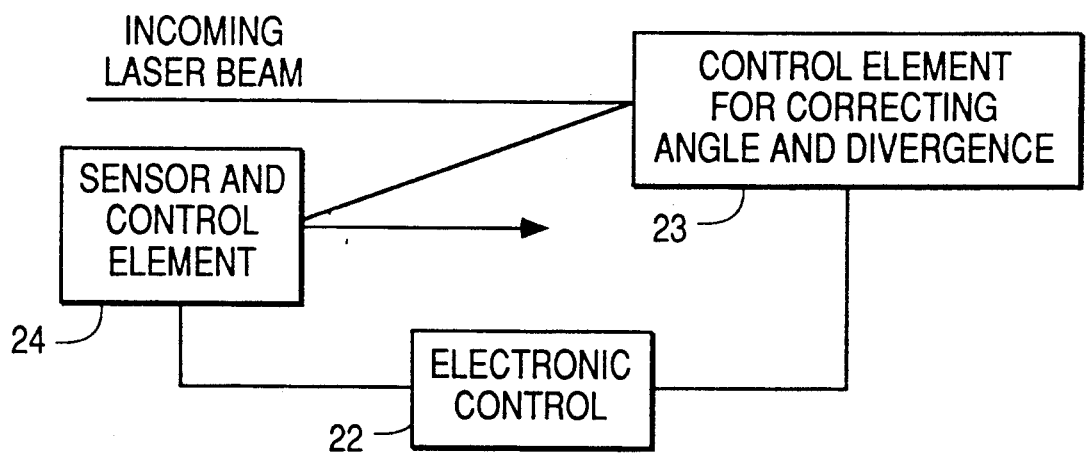
FIG. 2 is a schematic depiction of an alternative embodiment of the invention.

In the above-described embodiment of the invention, correction of angle and focussing errors takes place in an open control loop, as shown in FIG. 1. That is, the incoming laser beam's angle and divergence are measured in the sensor and adjusting element 24 by the four quadrant sensor 14, and are also corrected by the sensor and adjusting element in the manner described above. Alternatively, it is of course also possible to achieve such corrections in a closed loop or feedback arrangement, as shown in FIG. 2. That is, an arrangement, in which beam angle and divergence are measured in the sensor and adjusting element 24 as described above, and fed back to electronic control unit 22 and a separate correcting element 23 to achieve correction of beam divergence.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A sensor and adjusting arrangement for controlling highpower laser radiation, comprising:
   a compression proof dimensionally stable housing body having an opening at a first end thereof and a base plate at a second end thereof opposite said first end;
   a ring shaped flexible member arranged across said open end of said housing body, said member having a central opening therein;
   a member plate having an optical mirror surface which reflects a portion of laser radiation directed thereon and transmits a portion of said radiation; said mirror plate being carried on said ring shaped flexible member and arranged across said central opening thereof;
   a holographic optical pattern arranged at a side of said mirror plate which faces said ring shaped flexible member, said pattern being adapted to focus laser radiation transmitted by said mirror plate;
   a quadrant detector arranged in said housing body at said base plate and positioned to receive laser radiation transmitted by said mirror plate;
   a light chopper arranged in said housing body and positioned in a path of laser radiation transmitted by said mirror plate;
   at least two adjusting elements for adjusting position of said mirror plate to correct angular orientation of said laser radiation; and
   means for causing said mirror plate to bulge outward from said housing body by a defined amount.

2. A sensor and adjusting arrangement according to claim 1, wherein the mirror plate comprises a transparent silicon disk having a dielectric coating on said optical surface and wherein cooling ducts are provided in said silicon disk opposite said optical mirror surface, by one of: milling or cutting.

3. A sensor or adjusting arrangement according to claim 1, wherein the mirror surface of the mirror plate comprises a dielectric coating which reflects 99% of the laser radiation of the wavelength of 10.6 mm.

4. A sensor or adjusting arrangement according to claim 2, wherein the mirror surface of the mirror plate comprises a dielectric coating which reflects 99% of the laser radiation of the wavelength of 10.6 mm.

5. A sensor and adjusting arrangement according to claim 2, wherein the holographic pattern is provided on a surface of said silicon disk and covers the cooling ducts and has an etched in holographic pattern.

6. A sensor and adjusting arrangement according to claim 1, wherein an electronic device coupled to the four-quadrant detector determines the magnitude of the angular positioning and focussing errors of the laser beam and emits correction control signals for the adjusting elements.

7. A sensor and adjusting arrangement according to claim 2, wherein an electronic device coupled to the four-quadrant detector determines the magnitude of the angular positioning and focussing errors of the laser beam and emits correction control signals for the adjusting elements.

8. A sensor and adjusting arrangement according to claim 5, wherein an electronic device coupled to the four-quadrant detector determines the magnitude of the angular positioning and focussing errors of the laser beam and emits correction control signals for the adjusting elements 9. A sensor and adjusting arrangement according to claim 1, wherein the adjusting elements are one of: piezoelectric or magnetostrictive actuators.

10. A sensor and adjusting arrangement according to claim 2, wherein the adjusting elements are one of: piezoelectric or magnetostrictive actuators.

11. A sensor and adjusting arrangement according to claim 3, wherein the adjusting elements are one of: piezoelectric or magnetostrictive actuators.

12. A sensor and adjusting arrangement according to claim 6, wherein the adjusting elements are one of: piezoelectric or magnetostrictive actuators.

13. A sensor and adjusting arrangement according to claim 1, wherein the ring-shaped flexible member is operatively connected with the adjusting elements.

14. A sensor and adjusting arrangement according to claim 2, wherein the ring-shaped flexible member is operatively connected with the adjusting elements.

15. A sensor and adjusting arrangement according to claim 6, wherein the ring-shaped flexible member is operatively connected with the adjusting elements.

16. A sensor and adjusting arrangement according to claim 1, wherein said means for causing said mirror plate to bulge comprises means for increasing or decreasing pressure in said housing body by a flow of gas into or out of said housing through a gas feeding device.

17. A sensor and adjusting arrangement according to claim 6, wherein said means for causing said mirror plate to bulge comprises means for increasing or decreasing pressure in said housing body by a flow of gas into or out of said housing through a gas feeding device.

18. A sensor and adjusting arrangement according to claim 1, wherein a differential pressure sensor having a control valve is arranged in the base plate for adjustment of the desired gas pressure in the housing body.

19. A sensor and adjusting arrangement according to claim 16, wherein a differential pressure sensor having a control valve is arranged in the base plate for adjustment of the desired gas pressure in the housing body.

* * * * *